United States Patent

Nakamura et al.

Patent Number: 6,013,208

Date of Patent: Jan. 11, 2000

[54] MANUFACTURING METHOD FOR CARBON MATERIAL FOR ELECTRICAL DOUBLE LAYER CAPACITOR

[75] Inventors: Akihiro Nakamura; Tadayoshi Iwasaki; Takashi Inui; Toshiya Miyagawa; Yasuo Tatsumi, all of Tokyo, Japan

[73] Assignee: Nippon Sanso Corporation, Tokyo, Japan

[21] Appl. No.: 09/075,225

[22] Filed: May 11, 1998

[30] Foreign Application Priority Data

May 13, 1997 [JP] Japan .................................. 9-122561

[51] Int. Cl.[7] .................................................. H01G 9/155
[52] U.S. Cl. ........................ 264/29.4; 264/29.5; 264/29.6; 264/29.7; 264/83; 264/102; 264/105; 423/460
[58] Field of Search .................... 264/29.4, 29.5, 264/29.6, 29.7, 101, 102, 104, 105, 82, 83; 423/445 R, 448, 460, 461; 252/502, 521.5

[56] References Cited

U.S. PATENT DOCUMENTS

| | | | |
|---|---|---|---|
| 2,315,346 | 3/1943 | Mitchell | 264/29.6 |
| 5,430,606 | 7/1995 | Adachi et al. | 423/460 |
| 5,772,974 | 6/1998 | Ohashi et al. | 252/503 |

FOREIGN PATENT DOCUMENTS

| | | |
|---|---|---|
| 1-242409 | 9/1989 | Japan . |
| 1-321620 | 12/1989 | Japan . |
| 3-180013 | 8/1991 | Japan . |
| 4-44407 | 7/1992 | Japan . |
| 4-70770 | 11/1992 | Japan . |
| 5-132377 | 5/1993 | Japan . |
| 5-49606 | 7/1993 | Japan . |
| 5-82324 | 11/1993 | Japan . |
| 6-56827 | 7/1994 | Japan . |
| 2601307 | 1/1997 | Japan . |

OTHER PUBLICATIONS

U.S. application No. 09/147,006, filed Sep. 9, 1998, pending.
U.S. application No. 09/118,828, filed Jul. 20, 1998, pending.
U.S. application No. 08/737,806, filed Nov. 27, 1996, pending.
U.S. application No. 08/750,845, filed Dec. 24, 1996, pending.
U.S. application No. 08/750,847, filed Dec. 24, 1996, pending.
U.S. application No. 08/776,609, filed Feb. 20, 1997, pending.

*Primary Examiner*—Jan H. Silbaugh
*Assistant Examiner*—Kenneth M. Jones
*Attorney, Agent, or Firm*—Oblon, Spivak, McClelland, Maier & Neustadt, P.C.

[57] ABSTRACT

A carbonaceous material for an electrical double layer capacitor is produced by performing a halogenation treatment step wherein a halogenated dry-distilled charcoal is obtained by bringing a dry-distilled charcoal into contact with a halogen gas; a molding treatment step of adding a binding agent to the halogenated dry-distilled charcoal to form a molded article; and a dehalogenation treatment step wherein a part or all of the halogen in the molded article is eliminated. The carbonaceous material for an electrical double layer capacitor obtained by this method is impregnated with sulfuric acid to form a carbon electrode for an electrical double layer capacitor. This electrode is used to form an electrical double layer capacitor.

11 Claims, 4 Drawing Sheets

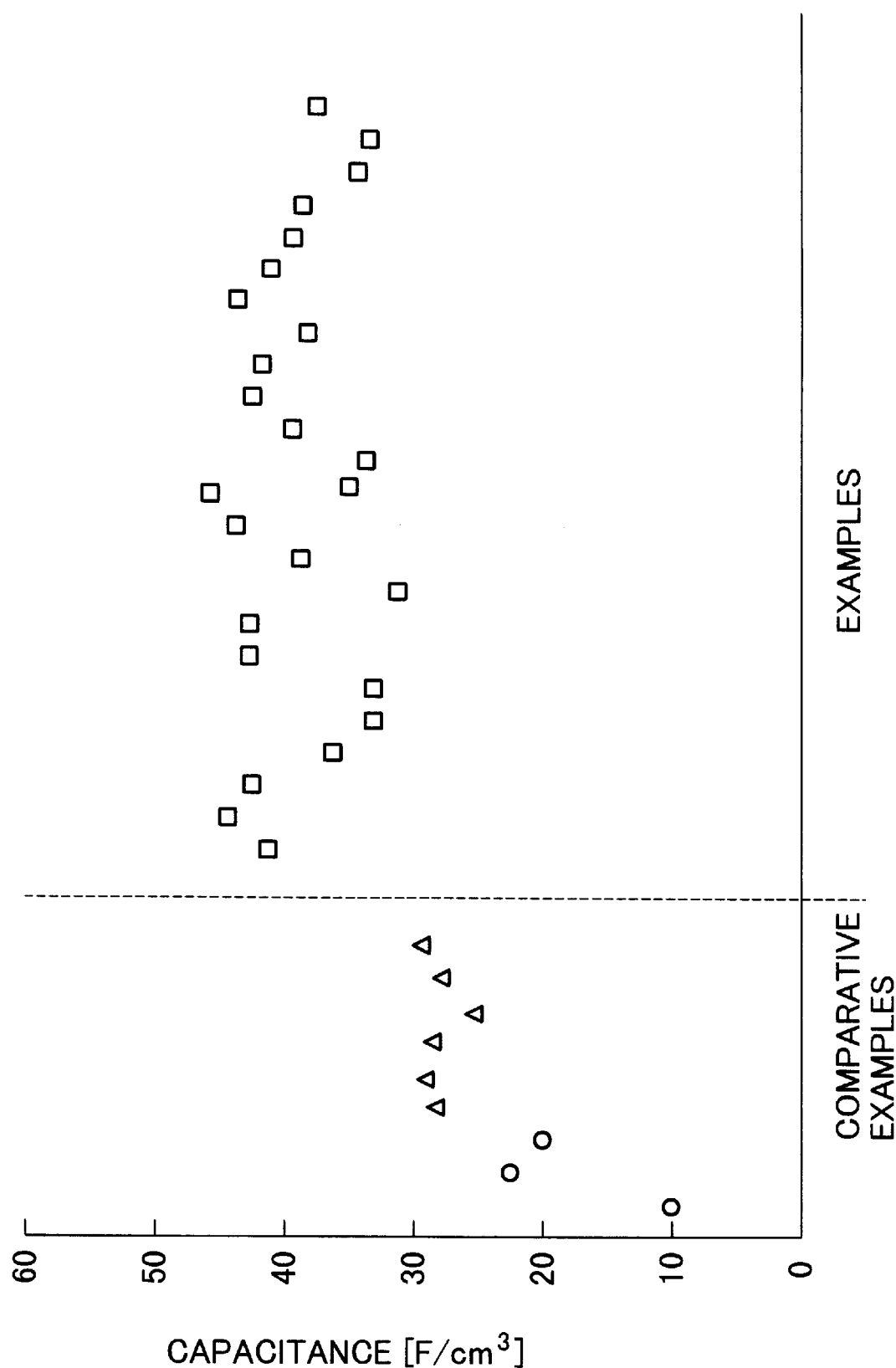

MANUFACTURING METHOD FOR CARBON MATERIAL FOR ELECTRICAL DOUBLE LAYER CAPACITOR

BACKGROUND OF THE INVENTION

1. Field of the Invention

The present invention relates to a carbonaceous material for use in electrodes of electrical double layer capacitors. The present invention relates to a manufacturing method for a carbon electrode and carbonaceous material having a micropore and/or sub-micropore structure in which electrolyte ions such as sulfate ions can suitably form an electrical double layer.

The present application is based on Patent Application No. Hei 9-122561 filed in Japan, the content of which is incorporated herein by reference.

2. Related Art

Electrical double layer capacitors are in practical use as backup power sources in electrical devices such as personal computers, and they are also under development as power sources of rapid discharge and large electric current such as auxiliary batteries for automobiles and the like. The electrodes of electrical double layer capacitors are also called polarizable electrodes and use activated carbon which is electrically conductive. Electrical double layer capacitors are used in various ways such as in situations of long term use with minute electric currents, situations of short term use with large electric currents, and in applications between these.

Starting Material for Carbonaceous Material

As the starting material for a carbonaceous material for an electrode, carbonized plant and animal material such as coal, coke, coconut shell char, any kind of resin such as phenol resin, furan resin, vinylidene chloride resin, etc. which have been heat-treated (dry-distilled) in an atmosphere of inert gas, and the like may be used. In the present invention, these starting materials are called carbon compounds in general, and materials obtained by dry-distilling carbon compounds are called dry-distilled charcoal.

Methods for Producing Activated Carbon; Activation Treatments

As commonly used methods for obtaining activated carbon, methods in which activation treatments are conducted using an oxidizing gas such as steam, carbon dioxide gas, and air are known.

As an example of steam activation, there is Japanese Patent Application, First Publication No. Hei 1-242409; as an example of carbon dioxide activation, there is Japanese Patent Application, First Publication No. Hei 5-132377; as a combination method of air (oxygen) activation with steam and/or carbon dioxide activation, there is Japanese Patent Application, Second Publication No. Hei 5-49606; and in addition, as an example of activation by means of hydroxides of sodium, potassium, and the like, there is Japanese Patent Application, First Publication No. Hei 2-97414 (Japanese Patent Application, Second Publication No. Hei 5-82324).

However, in normal activation treatments, the activation yield is of the level of 40–80% and the carbon loss reaches 20–60%. In addition, it is not possible to form pores of a uniform pore diameter.

Here, the activation yield refers to the weight after treatment when taking the weight of carbon compounds before treatment as 100.

Electrical Double Layer Capacitor

As electrical double layer capacitors which use carbonaceous material as electrodes, there are Japanese Patent Application, First Publication No. Hei 1-321620 (carbon paste electrodes); Japanese Patent Application, First Publication No. Hei 3-180013 (electrical double layer condensers); Japanese Patent Application, Second Publication No. Hei 6-56827 (polarizable electrodes and manufacturing method); Japanese Patent Application, Second Publication No. Hei 4-44407 (electrical double layer capacitor); and Japanese Patent Application, Second Publication No. Hei 4-70770 (electrical double layer capacitor).

Japanese Patent Application, Second Publication No. Hei 4-44407 discloses an electrical double layer capacitor which uses, as a polarizable electrode, an activated carbon obtained by preparing a phenol resin foam from phenol resin, polyvinyl alcohol and starch, and then conducting an activation treatment thereon. Since porous activated carbon having a specific surface area of 2000 $m^2/g$ or greater is obtained, it is possible to make a carbon electrode for an electrical double layer capacitor of large capacity.

Japanese Patent Application, Second Publication No. Hei 4-70770 discloses that when the average pore diameter of an activated carbon is made 15 Å or greater, a carbon electrode having good temperature characteristics is obtained.

Japanese Patent Application, First Publication No. Hei 3-180013 discloses that by making the oxygen content of a powdered activated carbon 20–35% by weight, the capacitance per unit of volume is increased.

Conventionally, the electrodes of electrical double layer capacitors use powdered activated carbon base material which has been made into a paste by mixing with a sulfuric acid solution, but the contact resistance between the particles of activated carbon is large, and large electrical currents cannot flow. In addition, in the same way, when fibrous activated carbon is used, the contact resistance between the fibers is large, the density of carbon per unit of volume is small, and it is not possible to obtain large electrical currents.

Structure of Carbonaceous Material

The structure of the carbonaceous material can take various forms depending on the starting material and the manufacturing method Char and activated carbon obtained by activating char comprise microcrystalline carbon (crystallite), and carbon which takes on a chain structure. When the carbonaceous material is a nongraphitizing carbon, the crystallites take on a structure which is layered in a disorderly manner, and a wide range of pores, from micropores to macropores, are formed in the gaps between these crystallites.

The crystallites are layers of net planes of six membered carbon rings of several parallel layers, and graphite carbon which has a six membered carbon ring structure bonds using hybridized orbitals $SP^2$. A net plane comprising six membered ring carbon is called a basal plane.

A graphitizing carbon develops crystallites by means of heating at a high temperature, and finally becomes graphite.

A non-graphitizing carbon usually contains unorganized carbon. Unorganized carbon is carbon other than graphite carbon which is chemically bonded to graphite carbon only; carbon which has a chain structure; carbon which adheres to six membered ring carbon; carbon which is in the periphery (the prism plane) of six membered ring carbon; carbon which is held in cross-linked structures with other six membered carbon rings (crystallites), and the like. Unorganized carbon is bonded with oxygen atoms, hydrogen atoms, and the like in forms such as C—H, C—OH, C—OOH, and C=O; or is in the form of double bonded carbon (—C=C—).

When pores have a diameter of 0.8 nm or less, they are called sub-micropores, when they have a diameter in the range of 0.8–2 nm, they are called micropores. Pore diameters within these spheres are approximately of the same order as the diameter of electrolyte ions, and therefore these pores are believed to take part in the formation of electrical double layers. Because present measuring techniques are unable to directly observe the pore structure of pores in the sub-micropore range, the situation at present is such that it is not possible to establish this as a general theory.

However, in conventional manufacturing methods for carbonaceous material for electrical double layer capacitors, since micropores and/or sub micropores are not sufficiently developed, the storage capacity for electrochemical energy is small, and capacitance is not sufficient. In addition, there is the problem that the carbon yield is low. In addition, efficiency for rapid discharge is unsatisfactory.

SUMMARY OF THE INVENTION

The present invention has the object of offering a carbonaceous material for an electrical double layer capacitor having a large capacity for storing electrochemical energy, with a high capacitance and good rapid discharge performance.

The manufacturing method for a carbonaceous material for an electrical double layer capacitor according to the present invention comprises a halogenation treatment step wherein a halogenated dry-distilled charcoal is obtained by bringing a dry-distilled charcoal into contact with a halogen gas; a molding treatment step of adding a binding agent to the halogenated dry-distilled charcoal to form a molded article; and a dehalogenation treatment step wherein a part or all of the halogen in the molded article is eliminated.

According to the present invention, it is possible to obtain a carbonaceous material which is suitable for use in the electrodes of electrical double layer capacitors, having exceptional capacitance for rapid discharge.

BRIEF DESCRIPTION OF THE DRAWINGS

FIG. 5 is a graph which compares the capacitance of the Examples and the Comparative Examples shown in Table 1.

DESCRIPTION OF PREFERRED EMBODIMENTS

Composition of Present Invention

Figure 1:
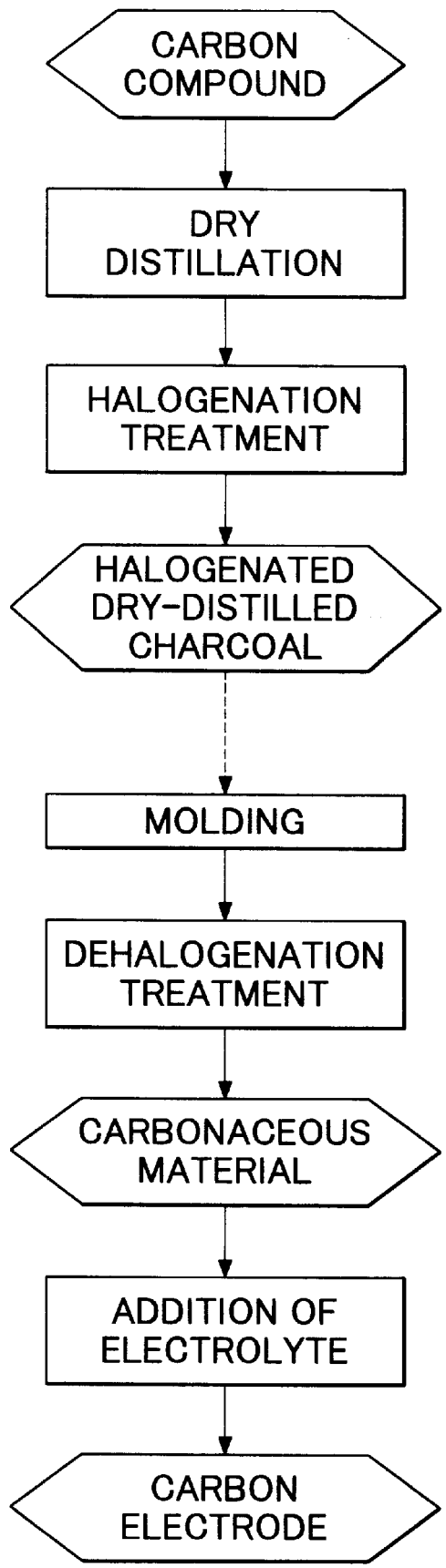
FIG. 1 is a process diagram of a manufacturing method for an electrode and carbon for an electrical double layer capacitor according to the present invention.
Figure 2:
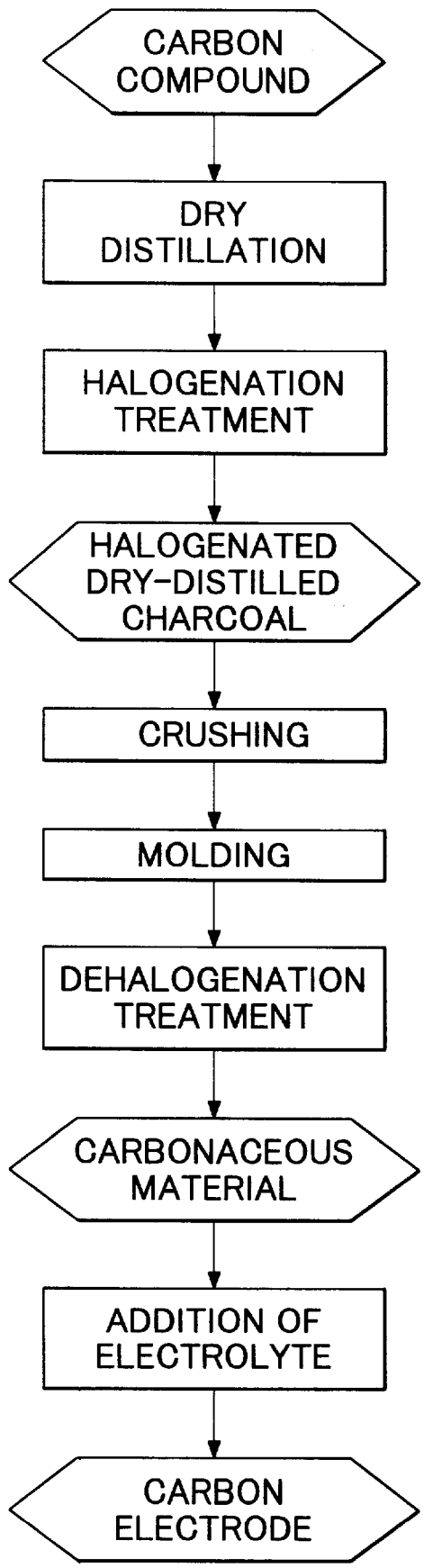
FIG. 2 is a process diagram of another manufacturing method for an electrode and carbon for an electrical double layer capacitor according to the present invention.

FIGS. 1 and 2 show outlines of manufacturing processes for an electrode and a molded carbonaceous material for an electrical double layer capacitor according to one embodiment of the present invention.

In the manufacturing method for the carbonaceous material for an electrical double layer capacitor according to the present invention first involves conducting a halogen treatment on dry-distilled charcoal. If the resulting halogenated charcoal is in powder form, then it is molded by adding a binding agent as is, and if the halogenated charcoal is in clusters, then it is molded by adding a binding agent after crushing. Thereafter, a dehalogenation treatment is performed, whereby a part or all of the halogens in the molded article are eliminated.

The degree of halogenation of the halogenated dry-distilled charcoal is expressed by the atomic ratio (X/C) of the halogen (X) to carbon (C). For the halogenation treatment, this atomic ratio is calculated by taking the weight of the dry-distilled charcoal before the halogenation treatment to be the weight of carbon, and taking the weight increase after the halogenation treatment to be the weight of the halogen, and converting the figures to atomic ratios. For the dehalogenation treatment, the weight decrease after the dehalogenation treatment is taken to be the decrease in halogens, which is converted to atomic number and then subtracted from the number of halogen atoms in the halogenated dry-distilled charcoal. In actual halogen treatments, due to the activating action of steam (the gasification of carbon), the dry-distillation action accompanying the progression of carbonization, and the like, the ratio of the number of atoms according to the above definition may have a negative value.

Halogenation Treatment

Chlorination treatments are characterized by heat-treating, dry-distilled charcoal at a temperature of 350–1000° C. and preferably at 400–800° C. in chlorine gas which has been diluted with an inert gas such as nitrogen. Bromination treatments are performed in a similar manner.

When the temperature of heating in the chlorination treatment exceeds 1000° C., the quantity of hydrogen atoms is reduced as dry distillation progresses, thereby decreasing the degree of chlorination, which is not desirable. In addition, when the temperature of heating in the chlorination treatment is less than 350° C., the reaction rate between the unorganized carbon and the chlorine is too slow, thereby requiring a long period of time for the chlorination treatment, which is also not desirable. The same is true of bromination treatments.

In chlorination treatments, the supply rate for the chlorine gas, when the concentration of the chlorine gas is approximately 10% by volume, is such that the superficial velocity in the column is of the level of 0.05–0.3 L/(min·cm$^2$) (L is the volume of the gas at approximately atmospheric pressure and room temperature, this is the same hereinafter). The time for the chlorination treatment is approximately 30 minutes when in the high temperature region of the above-mentioned temperature range, however, approximately 120 minutes are required when in the low temperature range close to 400° C. The bromination treatment requires approximately 180 minutes.

Since hydrogen atoms in the dry-distilled charcoal are mainly replaced by chlorine atoms during chlorination treatments, hydrogen chloride (HCl) is detected in the exhaust gas. During bromnination treatments, hydrogen bromide is generated.

By means of the above-mentioned chlorination treatment, chlorinated dry-distilled charcoal is obtained which has an atomic ratio (Cl/C) of chlorine (Cl) to carbon of preferably 0.03 or greater, and more preferably of 0.07 or greater. When this atomic ratio is less than 0.03, the contribution to the formation of the micropores is small, which is not desirable. In addition, while the upper limit of the above-mentioned atomic ratio is determined by the quantity of hydrogen atoms in the dry-distilled charcoal, i.e. the dry-distillation temperature, it is understood that the desired effects of the present invention may be obtained at 0.315 or less.

In the bromination treatment, even when the atomic ratio (Br/C) of bromine (Br) to carbon is on the order of 0.01, the effects of the present invention can be obtained.

Dehalogenation Treatment

While the level of chlorine remaining after the dechlorination treatment, i.e. the atomic ratio (Cl/C) of chlorine to carbon, should preferably be 0.02 or less, it is not always necessary for the chlorine to be completely eliminated.

Similarly, while the level of bromine remaining after the debromination treatment, i.e. the atomic ratio (Br/C) of bromine to carbon, should preferably be 0.01 or less, it is not always necessary for the bromine to be completely eliminated.

During the dechlorination treatment, the chlorine in the dry-distilled charcoal is eliminated mainly as hydrogen chloride, so hydrogen chloride is detected in the exhaust gas. In the same way, during the debromination treatment, hydrogen bromide is detected.

High temperature dechlorination treatments are characterized by being heat treatments under vacuum evacuation or in an inert gas at temperatures of 600–1100° C., and preferably at 700–1000° C. The degree of vacuum evacuation is not particularly restricted, and vacuum evacuation approaching 10 Torr is sufficient. A time of 20–30 minutes is sufficient for the heat treatment.

When a high temperature dehalogenation treatment in inert gas is conducted at treatment temperatures exceeding 1100° C., the openings of the fine pores become too small due to heat shrinkage and sulfate ions cannot enter inside the fine pores, thereby preventing the desired amount of capacitance from being obtained. In addition, when a high temperature dehalogenation treatment is conducted at temperatures lower than 600° C., the halogen cannot be sufficiently eliminated.

Low temperature dehalogenation treatments are characterized by being heat treatments conducted in a hydrogen compound gas or in a hydrogen compound gas which has been diluted with an inert gas. A heat treatment time of 20–30 minutes is sufficient. When the hydrogen compound gas is steam or a lower hydrocarbon, the heat treatment temperature should be 600–850° C., preferably 650–800° C. When the hydrogen compound gas is hydrogen gas, the heat treatment temperature should be 600–1100° C., preferably 650–1100° C.

When the hydrogen compound gas is steam and the heat treatment is performed at a temperature exceeding 850° C., the activation action of the steam progresses too quickly, thereby inhibiting the formation of micropores, reducing the carbon yield and reducing the effects of the present invention. When the hydroggen compound gas is hydrogen gas, there is no activation action, and the upper limit temperature may be 1100° C. Additionally, if low temperature halogenation treatments are performed at less than 600° C., the dehalogenation rate becomes too slow, and the efficiency is degraded.

Here, hydrogen compound gas refers to steam ($H_2O$), hydrogen, lower hydrocarbons such as methane ($CH_4$), ethane ($C_2H_6$), ethylene ($C_2H_4$), propane ($C_3H_8$), propylene ($C_3H_6$), butane ($C_4H_{10}$) and butylene ($C_4H_8$), and mixtures of these gases. As a hydrogen compound gas in an inert gas, the exhaust gas of LPG (liquefied petroleum gas) which has been incompletely burned can be favorably used for industrial purposes. The composition of such an exhaust gas is, for example, steam 13–17% by volume, carbon dioxide: 9–12% by volume; carbon monoxide: 0.01–1% by volume; nitrogen: 68–74% by volume, and unburned lower hydrocarbons: 0.01–3% by volume.

When the above-mentioned hydrogen compound is steam, the concentration of the steam is not particularly restricted, but when the superficial velocity in the column is 0.05–0.15 L/(min·cm$^2$), 3% by volume is sufficient.

There are five treatment methods for dehalogenation: methods in which only a high temperature dehalogenation treatment is performed; methods in which only a low temperature dehalogenation treatment is performed; treatments which are combinations of these methods including those in which a high temperature dehalogenation treatment and a low temperature dehalogenation treatment are successively performed; treatments in which a low temperature delhalogenation treatment and a high temperature dehalogenation treatment are successively performed; and treatments in which a high temperature dehalogenation treatment, a low temperature dehalogenation treatment, and a high temperature dehalogenation treatment are successively performed.

Among the treatment methods for dehalogenation explained above, when employing a treatment in which a high temperature dehalogenation treatment and a low temperature dehalogenation treatment are successively performed using as the hydrogen compounds steam, or a mixture of steam and a lower hydrocarbon, the effects of the present invention become even more apparent.

Molding

The crushing of dry-distilled charcoal or chlorinated dry-distilled charcoal can be performed by means of commonly used devices. The average size of the crushed particles may be from several $\mu$m to tens of $\mu$m. While there are cases where it is preferable to perform chlorination treatments with respect to dry-distilled charcoal in powder form, the crushing treatment may of course be skipped when the chlorinated dry-distilled charcoal obtained in this way is in powder form.

As the binding agent used for molding, phenol resin powder dissolved in an organic solvent (such as an alcohol, a ketone such as acetone, or the like), and a lipophilic solvent (such as creosote oil, coal tar, anthracene oil, kerosene oil, liquid paraffin, ethylene glycol, glycerin, or the like) can be used. The molding can be performed using equipment which is used in conventional techniques.

The rate of temperature increase (rate of heating) when heating the molded article which has undergone the molding treatment in order to perform the dehalogenation treatment should be 20–500° C./h, preferably 50–400° C./h. When the rate of temperature increase is less than 20° C./h, the treatment time becomes long and the efficiency is degraded. When the rate of temperature increase exceeds 500° C./h, deformation (swelling/warpage) and damage (chips/cracks/peeling) occur in the molded carbon, and a suitable shape cannot be obtained.

The molded carbonaceous material as used in the present invention is a carbonaceous material having a carbon structure wherein the binding agent is carbonized so as to integrate the carbon base material and the binding agent.

The above-mentioned manufacturing method for a carbonaceous material for an electrode can be applied to various dry-distilled charcoals, but is particularly suited to use with a starting material of dry-distilled charcoal obtained by dry-distilling coconut shell, phenol resin, furan resin, or vinylidene chloride resin.

The carbonaceous material obtained by the methods of the present invention are characterized in that the pore volume is 0.15–0.40 cm$^3$/g, and the density is 0.7–1.0 g/cm$^3$.

Manufacture of Electrode

The molded carbonaceous material which has been given a halogen treatment can be formed into an electrode by immersing the carbonaceous material, which has been cut into the desired shape, in an electrolytic solution. In this case, it is preferable to immerse the carbonaceous material in electrolytic solution while in a vacuum or under reduced pressure in order to enable the electrolytic solution to penetrate into the inner parts of the carbonaceous material.

As the electrolyte, aqueous solutions such as sulfuric acid ($H_2SO_4$), potassium hydroxide (KOH), hydrochloric acid (HCl), and sodium sulfate ($Na_2SO_4$) can be used. In addition, tetraethylammonium perchlorate, tetraethylammonium fluoroborate, lithium perchlorate, alkali metal salts, amine salts, tetraalkylammonium salts, tetraalkylphosphonium salts, and the like dissolved in a solvent such as polypropylene carbonate, γ-butyllactone, acetonitrile, dimethylfornmamide, 1,2-dimethoxyethane, sulfolane, nitromethane, or the like can be used.

The present invention is characterized in that when a halogenated molded carbonaceous material is used as an electrode and sulfate ions are used as the electrolytic ions, the capacitance is 30–50 F/cm$^3$ for rapid discharge. Here, F represents Farads, and cm$^3$ represents the volume of the carbon electrodes (the total of the positive and negative electrodes).

Next, the functions of the present invention shall be explained.

Halogen Treatment

A nongraphitizing carbon usually contains unorganized carbon. Unorganized carbon is carbon other than graphite carbon which is chemically bonded to graphite carbon only; carbon which has a chain structure; carbon which is adhered around six membered ring carbon; carbon which is in the periphery (the prism plane) of six membered ring carbon; carbon which is held in cross-linked structures with other six membered carbon rings (crystallites), and the like.

Explaining an example using chlorine as the halogen, when chlorine gas is brought into contact with dry-distilled charcoal, the chlorine reacts with the unorganized carbon. In these reactions, there are addition reactions of chlorine to double bonded carbons, exchange reactions of chlorine atoms for hydrogen atoms which are bonded to the unorganized carbon (hydrogen chloride in a molar equivalent to chlorine is generated), dehydrogenation reactions (hydrogen chloride twice that of the chlorine is generated), and the like.

At the time of the above-mentioned chlorine reactions and at the time of the dechlorination reactions, it is believed that the reaction shown in the following formula occurs, to form new bonds between carbons (hereinatter, carbon bonds). The mark C□ represents unorganized carbon.

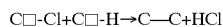

By means of the formation of these new carbon bonds, effects such as the effect of repairing defects in the polyaromatic ring structure of the crystallites or the carbon net planes, the effect of growth of the crystallites, and the effect of changes in the aggregation condition of crystallites are believed to take place, but the details are unclear. However, by means of these effects, it is believed that a large number of micropore and/or sub-micropore structures are formed in which electrolyte ions such as sulfate ions can suitably form electrical double layers.

Bromine, as well as other halogens, are also believed to have the effects described above.

Molded Article

When heating the molded article during the dehalogenation treatment, the binding agent added for the molding treatment is carbonized so as to generate a gasified component which moves from inside the molded article to the outside. Consequently, if the temperature increase is too rapid, the rate of generation of gas is high, and this causes deformations and damage to the molded article. Therefore, it is preferable that the rate of temperature increase not be too fast.

Additionally, a part of the halogen in the halogenated carbon is released in the form of the halogen, and this halogen reacts with the carbon formed by carbonization of the binding agent. That is, the carbon formed from the binding agent is halogenated, and when this halogenated carbon is dehalogenated in the subsequent dehalogenation treatment, the carbon formed from the binding agent is also believed to generate the effects of the halogenation treatment of the present invention.

In the present invention, since the halogenation treatment is performed after the binding agent is carbonized, the entire molded article is able to contribute to electrical charge/discharge, and the resistance is small, thus enabling a large capacitance to be obtained even for cases of rapid discharge.

EXAMPLES

Hereinbelow, the present invention shall be explained in detail based on examples and comparative examples.

Dry-distilled Charcoal Starting Materials

In the present Examples, the dry-distilled charcoal starting materials and their manufacturing, methods are indicated by the following terms.

Dry-distilled Charcoal A: Phenol resin (PGA-4560, product name: Resitop, manufactured by Gun-ei Chemical Industry (Ltd:)) which has been hardened at 160° C., dry-distilled at 550° C. in a nitrogen gas current, finely crushed (crusher: Model MB-1 manufactured by Chuo Kakouki (Ltd.)), then made into pellets (small cylinders) of 2 mm φ×5–6 mm using Resitop as a binder (pelletizer: Model PV-5 manufactured by Fuji Powdal (Ltd.)), then dry-distilled at 600° C. in a nitrogen gas current.

Dry-distilled Charcoal B: Philippine coconut shell char which has been finely crushed, then dry-distilled at 600° C. in a nitrogen gas current.

Dry-distilled Charcoal C: Furan resin (VF-302 manufactured by Hitachi Kasei Kogyo (Ltd.)) which has been hardened by the addition of a hardening agent, dry-distilled at 550° C., finely crushed, then made into pellets (small cylinders) of 2 mm φ×5–6 mm using coal tar as a binder, and dry-distilled at 550° C. in a nitrogen gas current.

Dry-distilled Charcoal D: Vinylidene chloride resin (commercially available plastic wrap such as Saran Wrap) which has been dry-distilled at a temperature of 550° C.

in a nitrogen gas current, finely crushed, then made into pellets (small cyinders) of 2 mm φ×5–6 mm using Resitop as a binder, and dry-distilled at 550° C. in a nitrogen gas current.

Molding Treatment

The halogenated dry-distilled charcoal is crushed for approximately 60 minutes in a vibrating ball mill (NB-0 manufactured by Nitto Kagaku (Ltd.)). The average particle size of the obtained carbon powder is about 8 μm.

15 parts by weight of phenol resin as a binding agent, 8 parts by weight of ethanol, and 20 parts by weight of creosote were added and kneaded into 100 parts by weight of crushed dry-distilled charcoal powder, and then molded into 50×50×1 (mm) sheets by pressing at a pressure of 500 kgf/cm². The weight of the molded product was about 2.5–3 g per sheet.

Equipment for Halogen Treatment

Figure 3:
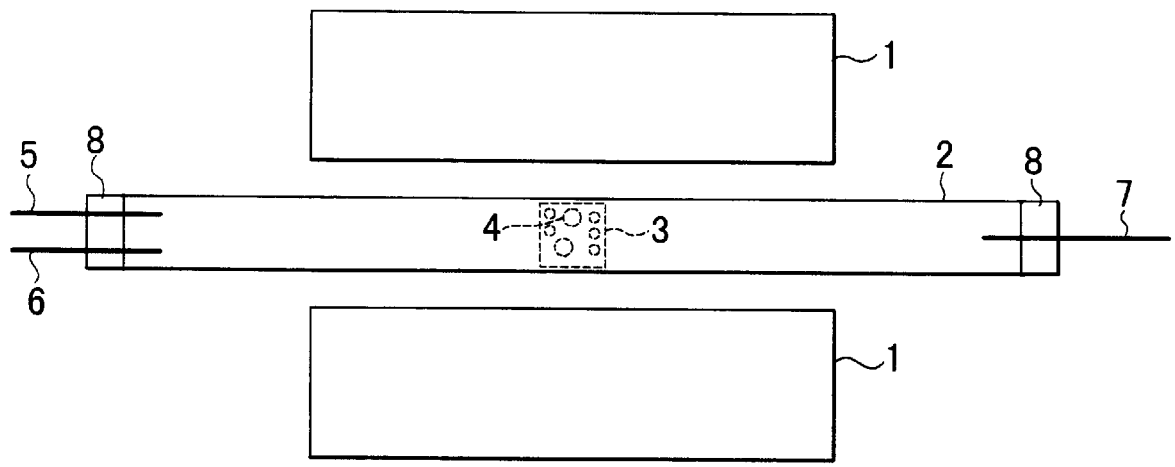
FIG. 3 is an outline diagram of the halogen treatment equipment.

An outline of the equipment for conducting the halogen treatment for putting the present invention into practice is shown in FIG. 3. In FIG. 3, reference number 1 is a pipe-shaped electric kiln which is equipped with a temperature control device (the pipe-shaped kiln is manufactured by Yoshida Seisakusho (Ltd.), the temperature control device is a thermocouple, JIS R, Model SU manufactured by Chino (Ltd.)); 2 is a quartz pipe; 3 is a container (gas permeable) for carbonaceous material; 4 is a carbonaceous material; 5 is a nitrogen gas supply pipe; 6 is a supply pipe for chlorine, bromine, steam, methane, or the like; 7 is an exhaust gas outlet pipe; and 8 is a rubber stopper. The supplying pressure for each gas was approximately atmospheric pressure.

In the halogenation treatment, nitrogen gas flows at a predetermined rate from pipe 5, and chlorine gas or bromine gas flows at a predetermined rate from pipe 6. In the high temperature dechlorination treatment, nitrogen gas flows from pipe 6 at a predetermined rate. In the low temperature dechlorination treatment, nitrogen gas flows from pipe 5 at a predetermined rate; and nitrogen gas containing steam, methane, or the like flows from pipe 6 at a predetermined rate. The flow rate was measured by a float-type flowmeter (chlorine gas: PGF-N model manufactured by Ryutai Kogyo (Ltd.)); (in the case of bromine gas, the data is corrected); other (gases: ST-4 model manufactured by Nippon Flowcell (Ltd.)).

Measurement of the Specific Surface Area and Pore Volume

The specific surface area was calculated from the Brunauer-Emmett-Teller adsorption equation after measuring the amount of nitrogen gas adsorbed at −196° C. (the temperature at which liquid nitrogen boils). The measurement equipment used was an Accusorb 2100-02 model manufactured by Shimadzu Seisakusho (Ltd.).

The pore volume was calculated as the value of the amount of benzene adsorbed (g) per gram of carbonaceous material divided by the density of liquid benzene (0.879 g/cm³).

Measurement of Capacitance

In order to form electrodes from molded carbon, two round discs having a diameter of 14 mm a thickness of 1 mm are cut from a suitable molded carbon which has been given a chlorine treatment, and then impregnated with 30% by weight of sulfuric acid solution at reduced pressure.

The result which has been impregnated with sulfuric acid solution is referred to as a carbon electrode. In contrast to this, the powdered or molded carbon before it is made into a carbon electrode is referred to as carbonaceous material for an electrical double layer capacitor.

Figure 4:
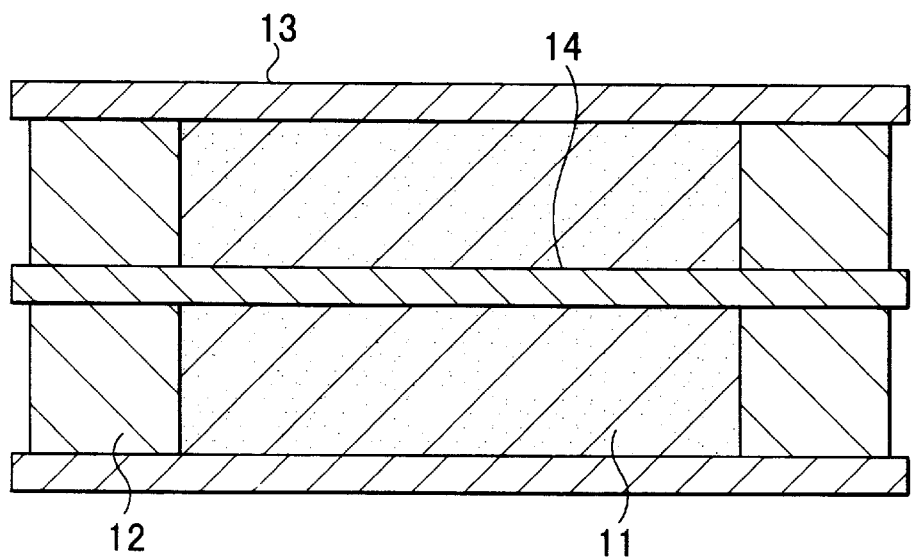
FIG. 4 is a cross-sectional outline diagram of a capacitance measurement cell.

The measuring cell shown in FIG. 4 is made by layering these two electrodes so as to face each other, a polypropylene separator being sandwiched therebetween, and sandwiching them from both sides by platinum collecting electrodes. Using the measuring cell, the capacitance is measured. In FIG. 4, reference number 11 is a carbon electrode, 12 is a gasket, 13 is a collecting electrode, and 14 is a separator. In general, capacitance C (units: Farads, F) can be calculated from $C=I\times\Delta t/(V_1-V_2)$, by charging at a certain voltage, and measuring the time $\Delta t(s)$ for the reduction in the voltage from $V_1$ to $V_2$ (V) due to discharging at a constant current I(A).

Situations in which the discharge current I is small are referred to as moderate discharge, and the value for capacitance is a large value. Situations in which the discharge current I is large are referred to as rapid discharge, and the capacitance has a small value. Situations in which the discharge current is 300 mA/cm² are rapid discharge. cm² is the cross-sectional area of the carbon electrode.

In the following comparative examples and examples, the capacitance was determined after charging for 24 hours at 900 mV, then discharging at a constant current of I=300 mA/cm² (rapid discharge), and measuring the time for the voltage to decrease from $V_1$=540 mV to $V_2$=360 mV.

Comparative Example 1

Dry-distilled Charcoal A, No Halogen Treatment

Dry-distilled charcoal A was crushed so as to have an average particle size of approximately 9 μm. An organic binding agent was added and the result was molded. This was heated in a nitrogen gas current (2 L/min) at a temperature increase rate of 100° C./h, and heat treated for 60 minutes at 600° C. for Sample (1), 800° C. for Sample (2) and 1000° C. for Sample (3). The shapes of the resulting molded articles were good. Electrodes were made from these and their capacitances were measured. The capacitances of the respective samples were (1) 9.5 F/cm³, (2) 21.4 F/cm³ and (3) 19.5 F/cm³. The pore volumes of the molded articles were (1) 0.17 cm³/g, (2) 0.15 cm³/g, and (3) 0.14 cm³/g. The densities were (1) 0.76 g/cm³, (2) 0.86 g/cm³ and (3) 0.87 g/cm³.

When the temperature increase rate was made 550° C./h, there were cases of deformations in the resulting molded articles, but the shapes were good when the temperature increase rate was 500° C./h or less.

Comparative Example 2

Dry-distilled Charcoal A, Two-stage Carbon Dioxide Gas Activation

Dry-distilled charcoal A was carbonized by a heat treatment for 30 minutes at 900° C. Subsequently, a primary activation was performed by a heat treatment for 1 hour at 900° C. in carbon dioxide gas, to obtain a particulate active carbon having a specific surface area of 650 m²/g. The primary activation yield (=weight after activation/weight before activation) was 92%. This particulate active carbon material was crushed into a powder of an average particle size of 9 μm, after which an organic binding agent was added and the result was molded. This was heated in a nitrogen gas current (2 L/min) at a temperature increase rate of 100° C./h, then carbonized by maintaining at a temperature of 900° C. for 30 minutes. Subsequently, secondary activation was performed in carbon dioxide gas at 800° C. for 10 hours for Sample (1), 20 hours for Sample (2) and 30 hours for Sample (3). At this time, the activation yields were (1) 93%, (2) 84% and (3) 76%. Therefore, the total yields were (1) 86%, (2) 77% and (3) 72%. The shapes of the resulting molded articles were good. Electrodes were made from these and their capacitances were measured. The capacitances of the respective samples were (1) 28.7 F/cm$^3$, (2) 27.8 F/cm$^3$ and (3) 27.3 F/cm$^3$. The pore volumes of the molded articles were (1) 0.29 cm$^3$/g, (2) 0.31 cm$^3$/g and (3) 0.37 cm$^3$/g. The BET specific surface areas were (1) 740 m$^2$/g, (2) 1080 m$^2$/g and (3) 1370 m$^2$/g.

Comparative Example 3

Dry-distilled Charcoal B, Two-stage Carbon Dioxide Gas Activation

Dry-distilled charcoal B was carbonized by a heat treatment for 30 minutes at 900° C. Subsequently, a primary activation was performed by a heat treatment for 1 hour at 900° C. in carbon dioxide gas. The primary activation yield was 94%. This particulate active carbon material was crushed into a powder of an average particle size of 9 μm, after which an organic binding agent was added and the result was molded. The resulting molded article was heated in a nitrogen (gas current (2 L/min) at a temperature increase rate of 100° C./h, then carbonized by maintaining at a temperature of 900° C. for 30 minutes. Subsequently, secondary activation was performed in carbon dioxide gas at 800° C. for 10 hours. At this time, the activation yield was 93%. Therefore, the total yield was 87%. The shape of the resulting molded article was good. An electrode was made from this and its capacitance was measured. The capacitance was 24.2 F/cm$^3$.

Comparative Example 4

Dry-distilled Charcoal C, Two-stage Carbon Dioxide Gas Activation

Dry-distilled charcoal C was carbonized by a heat treatment for 30 minutes at 900° C. Subsequently, a primary activation was performed by a heat treatment for 1 hour at 900° C. in carbon dioxide gas. The primary activation yield was 91%. This particulate active carbon material was crushed into a powder of an average particle size of 9 μm, after which an organic binding agent was added and the result was molded. The resulting molded article was heated in a nitrogen gas current (2 L/min) at a temperature increase rate of 100° C./h, then carbonized by maintaining at a temperature of 900° C. for 30 minutes. Subsequently, secondary activation was performed in carbon dioxide gas at 800° C. for 10 hours. At this time, the activation yield was 92%. Therefore, the total yield was 84%. The shape of the resulting molded article was good. An electrode was made from this and its capacitance was measured. The capacitance was 26.8 F/cm$^3$.

Comparative Example 5

Dry-distilled Charcoal D, Sheet-form, Two-stage Carbon Dioxide Gas Activation

Dry-distilled charcoal D was carbonized by a heat treatment for 30 minutes at 900° C. Subsequently, a primary activation was performed by a heat treatment for 1 hour at 900° C. in carbon dioxide gas. The primary activation yield was 93%. This particulate active carbon material was crushed into a powder of an averagre particle size of 9 μm, after which an organic binding agent was added and the result was molded. The resulting molded article was heated in a nitrogen gas current (2 L/min) at a temperature increase rate of 100° C./h, then carbonized by maintaining at a temperature of 900° C. for 30 minutes. Subsequently, secondary activation was performed in carbon dioxide gas at 800° C. for 10 hours. At this time, the activation yield was 93%. Therefore, the total yield was 86%. The shape of the resulting molded article was good. An electrode was made from this and its capacitance was measured. The capacitance was 28.1 F/cm$^3$.

Example 1

Dry-distilled Charcoal A, Effect of Chlorination Temperature

The starting material was dry-distilled charcoal A which was dry-distilled again at a temperature of 700° C. 15 g each of the raw material dry-distilled charcoal were respectively heated for 60 minutes in a nitrogen gas current (1 L/min) containing 10% by volume of chlorine gas, at temperatures of 350° C. for Sample (1), 500° C. for Sample (2), 650° C. for Sample (3), 800° C. for Sample (4) and 1000° C. for Sample (5). With the weight of the raw material dry-distilled charcoal as a standard of reference, the weight increases in the samples after the chlorination treatment were respectively (1) 44% by weight, (2) 41% by weight, (3) 21% by weight, (4) 13% by weight and (5) 6% by weight. Next, the resulting chlorinated dry-distilled charcoal was crushed to an average particle size of 9 μm, and an organic binding agent was added for molding. Next, these were heated in a nitrogen gas current (2 L/min) at a temperature increase rate of 100° C./h, then maintained for 30 minutes at a temperature of 800° C. (high-temperature dechlorination treatment). These were further dechlorinated by heating for 15 minutes at a temperature of 700° C. in a nitrogen gas current (1 L/min) containing steam saturated at 25° C. (low-temperature dechlorination treatment). The shapes of the resulting molded articles were good. Electrodes were prepared from these and their capacitances were measured. The capacitances for the samples were respectively (1) 40.0 F/cm$^3$, (2) 42.5 F/cm$^3$, (3) 41.3 F/cm$^3$, (4) 35.2 F/cm$^3$ and (5) 32.1 F/cm$^3$. The pore volumes of the molded articles were (1) 0.27 cm$^3$/g, (2) 0.26 cm$^3$/g, (3) 0.23 cm$^3$/g, (4) 0.20 cm$^3$/g, and (5) 0.19 cm$^3$/g.

Example 2

Dry-distilled Charcoal A, Effect of Heating Temperature in Nitrogen Gas Current

The starting material was dry-distilled charcoal A which was dry-distilled again at a temperature of 700° C. The raw material dry-distilled charcoal was heated for 60 minutes in a nitrogen gas current (1 L/min) containing 10% by volume of chlorine gas, at a temperature of 600° C. With the weight of the raw material dry-distilled charcoal as a standard of reference, the weight increase in the samples after the chlorination treatment was 26% by weight. Next, the resulting chlorinated dry-distilled charcoal was crushed to an average particle size of 9 μm, and an organic binding agent was added for molding. Next, these were heated in a nitrogen gas current (2 L/min) at a temperature increase rate of 100° C./h, then maintained for 30 minutes at a temperature of 600° C. for Sample (1), 700° C. for Sample (2), 900° C. for Sample (3) and 1100° C. for Sample (4) (high-temperature dechlorination treatment). These were further dechlorinated by heating for 15 minutes at a temperature of 700° C. in a nitrogen gas current (1 L/min) containing steam saturated at 25° C. (low-temperature dechlorination treatment). The shapes of the resulting molded articles were good. Electrodes were prepared from these and their capacitances were measured. The capacitances for the samples were respectively (1) 31.7 F/cm$^3$, (2) 41.3 F/cm$^3$, (3) 41.3 F/cm$^3$ and (4) 30.2 F/cm$^3$. The pore volumes of the molded articles were (1) 0.23 cm$^3$/g, (2) 0.25 cm$^3$/g, (3) 0.25 cm$^3$/g, and (4) 0.23 cm$^3$/g. The densities were (1) 0.81 g/cm$^3$, (2) 0.81 g/cm$^3$, (3) 0.83 g/cm$^3$ and (4) 0.84 g/cm$^3$.

Example 3

Dry-distilled Charcoal A, Effect of Low-temperature Dechlorination

The starting material was dry-distilled charcoal A which was dry-distilled again at a temperature of 700° C. The raw material dry-distilled charcoal was heated for 60 minutes in a nitrogen (gas current (1 L/min) containing 10% by volume of chlorine gas, at a temperature of 600° C. Next, the resulting chlorinated dry-distilled charcoal was crushed to an average particle size of 9 μm, and an organic binding agent was added for molding. Next, these were heated in a nitrogen gas current (2 L/min) at a temperature increase rate of 100° C./h, then maintained for 30 minutes at a temperature of 900° C. (high-temperature dechlorination treatment). These were further dechlorinated by heating for 15 minutes at a temperature of 600° C. for Sample (1), 700° C. for Sample (2) and 800° C. for Sample (3) in a nitrogen gas current (1 L/min) containing steam saturated at 25° C. (low-temperature dechlorination treatment). Sample (4) was heated at a temperature of 1000° C. in a nitrogen gas current (1 L/min) containing 50% by volume of hydrogen gas (low-temperature dechlorination treatment). The shapes of the resulting molded articles were good. Electrodes were prepared from these and their capacitances were measured. The capacitances for the samples were respectively (1) 37.7 F/cm$^3$, (2) 42.1 F/cm$^3$, (3) 44.2 F/cm$^3$ and (4) 33.0 F/cm$^3$. The pore volumes of the molded articles were (1) 0.23 cm$^3$/g, (2) 0.24 cm$^3$/g and (3) 0.26 cm$^3$/g. The densities were (1) 0.84 g/cm$^3$, (2) 0.83 g/cm$^3$ and (3) 0.78 g/cm$^3$.

Example 4

Dry-distilled Charcoal A, Dechlorination Method

The starting material was dry-distilled charcoal A which was dry-distilled again at a temperature of 700° C. The raw material dry-distilled charcoal was heated for 60 minutes in a nitrogen gas current (1 L/min) containing 10% by volume of chlorine gas, at a temperature of 600° C. Next, the resulting chlorinated dry-distilled charcoal was crushed to an average particle size of 9 μm, and an organic binding agent was added for molding. Sample (1) was heated in a nitrogen hTas current (2 L/min) at a temperature increase rate of 100° C./h, then maintained for 30 minutes at a temperature of 900° C. Sample (2) was heated in a nitrogen gas current (1 L/min) containing steam saturated at 25° C., at a temperature increase rate of 100° C./h, then maintained for 15 minutes at a temperature of 700° C. Sample (3) was heated in a nitrogen gas current (1 L/min) containing steam saturated at 25° C., at a temperature increase rate of 100° C./h, then maintained for 15 minutes at a temperature of 650° C., and further maintained for 30 minutes at a temperature of 900° C. in a nitrogen gas current (2 L/min). Sample (4) was heated in a nitrogen gas current (1 L/min) containing steam saturated at 25° C., at a temperature increase rate of 100° C./h, then maintained for 15 minutes at a temperature of 750° C., and further maintained for 30 minutes at a temperature of 700° C. in a nitrogen gas current (2 L/min). The shapes of the resulting four types of molded articles were good. Electrodes were prepared from these and their capacitances were measured. The capacitances for the samples were respectively (1) 32.6 F/cm$^3$, (2) 38.1 F/cm$^3$, (3) 41.2 F/cm$^3$) and (4) 40.5 F/cm$^3$. All of the dechlorination methods exhibited good performance.

Example 5

Dry-distilled Charcoal B

The starting material was dry-distilled charcoal B which was dry-distilled again at a temperature of 700° C. The raw material dry-distilled charcoal (15 g) was heated for 60 minutes in a nitrogen gas current (1 L/min) containing 10% by volume of chlorine gas, at a temperature of 600° C. to perform a chlorination treatment. The weight increase in the sample after the chlorination treatment using the weight of the raw material dry-distilled charcoal as a standard of reference was 26% by weight. Next, the resulting chlorinated dry-distilled charcoal was crushed to an average particle size of 9 μm, and an organic binding agent was added for molding. This was then heated in a nitrogen gas current (2 L/min) at a temperature increase rate of 200° C./h, then maintained for 30 minutes at a temperature of 900° C. Further, it was heated in a nitrogen gas current (1 L/min) containing steam saturated at 25° C. for 15 minutes at a temperature of 700° C. The shape of the resulting molded article was good. An electrode was prepared from this and the capacitance was measured. The capacitance was 37.0 F/cm$^3$.

Example 6

Dry-distilled Charcoal C

The starting material was dry-distilled charcoal C which was dry-distilled again at a temperature of 700° C. The raw material dry-distilled charcoal (15 g) was heated for 60 minutes in a nitrogen gas current (1 L/min) containing 10% by volume of chlorine gas, at a temperature of 600° C. to perform a chlorination treatment. The weight increase in the sample after the chlorination treatment using the weight of the raw material dry-distilled charcoal as a standard of reference was 21% by weight. Next, the resulting chlorinated dry-distilled charcoal was crushed to an average particle size of 9 μm, and an organic binding agent was added for molding. This was then heated in a nitrogen gas current (2 L/min) at a temperature increase rate of 200° C./h, then maintained for 30 minutes at a temperature of 900° C. Further, it was heated in a nitrogen gas current (1 L/min) containing steam saturated at 25° C. for 15 minutes at a temperature of 700° C. The shape of the resulting molded article was good. An electrode was prepared from this and the capacitance was measured. The capacitance was 42.1 F/cm$^3$.

Example 7

Dry-distilled Charcoal D

The starting material was dry-distilled charcoal D which was dry-distilled again at a temperature of 700° C. The raw material dry-distilled charcoal (15 g) was heated for 60 minutes in a nitrogen (gas current (1 L/min) containing 10% by volume of chlorine gas, at a temperature of 600° C. to perform a chlorination treatment. The weight increase in the sample after the chlorination treatment using the weight of the raw material dry-distilled charcoal as a standard of reference was 23% by weight. Next, the resulting chlorinated dry-distilled charcoal was crushed to an average particle size of 9 μm, and an organic binding agent was added for molding. This was then heated in a nitrogen gas current (2 L/min) at a temperature increase rate of 200° C./h, then maintained for 30 minutes at a temperature of 900° C. Further, it was heated in a nitrogyen gas current (1 L/min) containing steam saturated at 25° C. for 15 minutes at a temperature of 700° C. The shape of the resulting molded article was good. An electrode was prepared from this and the capacitance was measured. The capacitance was 39.8 F/cm$^3$.

Example 8

Bromination Treatment, Dry-distilled Charcoal A

Dry-distilled charcoal A (15 g) was heated for 180 minutes in a nitrogen gas current (1 L/min) containing 8% by volume of bromine gas, at a temperature of 500° C. for Sample (1), 600° C. for Sample (2) and 700° C. for Sample (3), in order to perform a bromination treatment. With the weight of the raw material dry-distilled charcoal as a standard of reference, the weight increases in the samples after the bromination treatments were respectively (1) 56% by weight, (2) 20% by weight and (3) 9% by weight. Next, these were crushed to an average particle size of 9 μm, and an organic binding agent was added for molding. This were then heated in a nitrogen gas current (2 L/min) at a temperature increase rate of 200° C./h, then maintained for 30 minutes at a temperature of 900° C. Further, these were heated in a nitrogen gas current (1 L/min) containing steam saturated at 25° C. for 15 minutes at a temperature of 700° C. The shapes of the resulting molded articles were good. Electrodes were prepared from these and their capacitances were measured. The capacitances were respectively (1) 38.1 F/cm$^3$, (2) 37.3 F/cm$^3$ and (3) 33.1 F/cm$^3$. The pore volumes of the molded articles were (1) 0.21 cm$^3$/g, (2) 0.18 cm$^3$/g and (3) 0.16 cm$^3$/g. Good performance was also obtained by the bromination treatment.

Example 9

Bromination Treatment, Dry-distilled Charcoal D

Dry-distilled charcoal B (15 g) was heated for 180 minutes in a nitrogen gas current (1 L/min) containing 8% by volume of bromine gas, at a temperature of 600° C. in order to perform a bromination treatment. With the weight of the raw material dry-distilled charcoal as a standard of reference, the weight increase in the sample after the bromination treatment was 21% by weight. Next, this was crushed to an average particle size of 9 μm, and an organic binding agent was added for molding. This was then heated in a nitrogen gas current (2 L/min) at a temperature increase rate of 200° C./h, then maintained for 30 minutes at a temperature of 900° C. Further, this was heated in a nitrogen gas current (1 L/min) containing steam saturated at 25° C. for 15 minutes at a temperature of 700° C. The shape of the resulting molded article was good. An electrode was prepared from this and the capacitance was measured. The capacitance was 32.2 F/cm$^3$.

Example 10

Bromination Treatment, Dry-distilled Charcoal C

The starting material was dry-distilled charcoal C which was dry-distilled again at a temperature of 700° C. The dry-distilled charcoal (15 g) was heated for 180 minutes in a nitrogen gas current (1 L/min) containing 8% by volume of bromine gas, at a temperature of 600° C. in order to perform a bromination treatment. With the weight of the raw material dry-distilled charcoal as a standard of reference, the weight increase in the sample after the bromination treatment was 17% by weight. Next, this was crushed to an average particle size of 9 μm, and an organic binding agent was added for molding. This was then heated in a nitrogen gas current (2 L/min) at a temperature increase rate of 200° C./h, then maintained for 30 minutes at a temperature of 900° C. Further, this was heated in a nitrogen gas current (1 L/min) containing steam saturated at 25° C. for 15 minutes at a temperature of 700° C. The shape of the resulting molded article was good. An electrode was prepared from this and the capacitance was measured. The capacitance was 36.5 F/cm$^3$.

The results of Comparative Examples 1–5 and Examples 1–10 are shown in Table 1. Additionally, FIG. 5 shows a graph comparing the capacitances of the comparative examples and the examples.

TABLE 1

| [1] | [2] | [3] | [4] | [5] | [6] | [7] | [8] | [9] | [10] | [11] | [12] | [13] |
|---|---|---|---|---|---|---|---|---|---|---|---|---|
| C Ex 1 | A | (1) | — | — | 600 | — | — | 9.5 | 0.17 | 0.76 | — | — |
|  |  | (2) | — | — | 800 | — | — | 21.4 | 9.15 | 0.86 | — | — |
|  |  | (3) | — | — | 1000 | — | — | 19.5 | 0.14 | 0.87 | — | — |
| C Ex 2 | A | (1) | — | — | 900 | — | — | 28.7 | 0.29 | — | 740 | — |
|  |  | (2) | — | — | 900 | — | — | 27.8 | 0.31 | — | 1080 | — |
|  |  | (3) | — | — | 900 | — | — | 27.3 | 0.37 | — | 1370 | — |
| C Ex 3 | B | (1) | — | — | 900 | — | — | 24.2 | — | — | — | — |
| C Ex 4 | C | (1) | — | — | 900 | — | — | 26.8 | — | — | — | — |
| C Ex 5 | D | (1) | — | — | 900 | — | — | 28.1 | — | — | — | — |
| Ex 1 | A | (1) | Cl | 350 | 800 | H$_2$O | 700 | 40.0 | 0.27 | — | — | — |
|  |  | (2) | Cl | 500 | 800 | H$_2$O | 700 | 42.5 | 0.26 | — | — | — |
|  |  | (3) | Cl | 650 | 800 | H$_2$O | 700 | 41.3 | 0.23 | — | — | — |
|  |  | (4) | Cl | 800 | 800 | H$_2$O | 700 | 35.2 | 0.29 | — | — | — |
|  |  | (5) | Cl | 1000 | 800 | H$_2$O | 700 | 32.1 | 0.19 | — | — | — |
| Ex 2 | A | (1) | Cl | 600 | 600 | H$_2$O | 700 | 31.7 | 0.23 | 0.81 | — | — |
|  |  | (2) | Cl | 600 | 700 | H$_2$O | 700 | 41.3 | 0.25 | 0.81 | — | — |
|  |  | (3) | Cl | 600 | 900 | H$_2$O | 700 | 41.3 | 0.25 | 0.83 | — | — |
|  |  | (4) | Cl | 600 | 1100 | H$_2$O | 706 | 30.2 | 0.23 | 0.84 | — | — |
| Ex 3 | A | (1) | Cl | 600 | 900 | H$_2$O | 600 | 37.7 | 0.23 | 0.84 | — | — |

TABLE 1-continued

| [1] | [2] | [3] [4] | [5] | [6] | [7] | [8] | [9] | [10] | [11] | [12] | [13] |
|---|---|---|---|---|---|---|---|---|---|---|---|
|  |  | (2) Cl | 600 | 900 | $H_2O$ | 700 | 42.1 | 0.24 | 0.83 | — | — |
|  |  | (3) Cl | 600 | 900 | $H_2O$ | 800 | 44.2 | 0.26 | 0.78 | — | — |
|  |  | (4) Cl | 600 | 900 | $H_2$ | 1000 | 33.0 | — | — | — | — |
| Ex 4 | A | (1) Cl | 600 | 900 | — | — | 32.6 | — | — | — | HT only |
|  |  | (2) Cl | 600 | — | $H_2O$ | 700 | 38.1 | — | — | — | LT Only |
|  |  | (3) Cl | 600 | 900 | $H_2O$ | 650 | 41.2 | — | — | — | LT → HT |
|  |  | (4) Cl | 600 | 700 | $H_2O$ | 750 | 40.5 | — | — | — | LT → HT |
| Ex 5 | B | Cl | 600 | 900 | $H_2O$ | 700 | 37.0 | — | — | — | — |
| Ex 6 | C | Cl | 600 | 900 | $H_2O$ | 700 | 42.1 | — | — | — | — |
| Ex 7 | D | Cl | 600 | 900 | $H_2O$ | 700 | 39.8 | — | — | — | — |
| Ex 8 | A | (1) Br | 500 | 900 | $H_2O$ | 700 | 38.1 | 0.21 | — | — | — |
|  |  | (2) Br | 600 | 900 | $H_2O$ | 700 | 37.3 | 0.18 | — | — | — |
|  |  | (3) Br | 700 | 900 | $H_2O$ | 700 | 33.1 | 0.16 | — | — | — |
| Ex 9 | B | Br | 600 | 900 | $H_2O$ | 700 | 32.2 | — | — | — | — |
| Ex 10 | C | Br | 600 | 900 | $H_2O$ | 700 | 36.5 | — | — | — | — |

Explanation of Symbols in Table 1

[1] Number of comparative example or example; C Ex: Comparative Example, Ex: Example
[2] Type of raw material dry-distilled charcoal
[3] Number of sample
[4] Type of halogen in halogenation treatment; Cl: chlorine, Br: bromine
[5] Temperature of halogenation treatment, ° C.
[6] Temperature of heating in nitrogen gas current (high-temperature dehalogenation), ° C.
[7] Type of hydrogen compound
[8] Temperature of heating in hydrogen compound gas atmosphere (low-temperature dehalogenation), ° C.
[9] Capacitance when discharge current is 300 mA/cm$^2$, F/cm$^3$
[10] Pore volume, cm$^3$/g
[11] Density, g/cm$^3$
[12] Specific surface area, m$^2$/g
[13] Other
  HT only: Only a high-temperature dechlorination treatment is performed.
  LT only: Only a low-temperature dechlorination treatment is performed.
  LT→HT: Low-temperature chlorination treatment, then high-temperature dechlorination treatment.
  (with the exception of Example 4, the low-temperature halogenation treatment is performed after the high-temperature chlorination treatment)

The highest capacitance at 300 mA/cm$^2$ (rapid discharge) among Comparative Examples 1–5 was 28.7 F/cm$^3$, and was roughly in the range of 9–29 F/cm$^3$. In contrast, for the Examples of embodiments of the present invention, the maximum was 44.2 F/cm$^3$, and roughly in the range of 31–44 F/cm$^3$.

That is, in comparison to the Comparative Examples, the Examples had a larger capacitance for rapid discharge when the discharge current was 300 mA/cm$^2$. With the present invention, it is possible to obtain a carbonaceous material for electrical double-layer capacitors which is particularly excellent with respect to rapid discharge.

The pore volumes of the molded charcoals obtained for the Examples was 0.16–0.27 cm$^3$/g, and the densities were 0.78–0.84 g/cm$^3$.

We claim:

1. A method for making a material comprising:
   halogenating carbonaceous material obtained from a heat treated carbonaceous material precursor with a halogen gas thereby forming a halogenated carbon wherein unorganized carbon has reacted with halogen;
   molding said halogenated carbon by adding a binding agent thereto to form a molded article, and
   dehalogenating said halogenated carbon of said molded article, wherein a part or all of said halogen in said molded article is eliminated, thereby forming said material.

2. The method according to claim 1, wherein said halogen gas is at least one halogen selected from the group consisting of chlorine and bromine.

3. The method according to claim 1, wherein said halogenating is a heat treatment conducted at a temperature of from 350 to 1000° C. in a halogen gas diluted with an inert gas.

4. The method according to claim 1, wherein said dehalogenating is a heat treatment conducted at a temperature of from 600 to 850° C. in steam or a hydrogen compound gas diluted with an inert gas.

5. The method according to claim 4, wherein a temperature increase rate in said dehalogenating is 20 to 500° C./h.

6. The method according to claim 1, wherein said dehalogenating is a heat treatment conducted at a temperature of from 600 to 1100° C. in hydrogen gas diluted with an inert gas.

7. The method according to claim 6, wherein a temperature increase rate in said dehalogenating is 20 to 500° C./h.

8. The method according to claim 1, wherein said dehalogenating is a heat treatment conducted at a temperature of from 600 to 1100° C. in an inert gas or under vacuum evacuation.

9. The method according to claim 8, wherein a temperature increase rate in said dehalogenating is 20 to 500° C./h.

10. The method according to claim 1, wherein said carbonaceous material precursor is at least one substance selected from the group consisting of coconut shell, phenol resin, furan resin, and vinylidene chloride resin.

11. The method according to claim 1, wherein said binding agent is a composition comprising phenol resin powder, an organic solvent and a lipophilic solvent.

* * * * *